United States Patent
Wu

(10) Patent No.: US 11,798,177 B2
(45) Date of Patent: Oct. 24, 2023

(54) HAND TRACKING METHOD, DEVICE AND SYSTEM

(71) Applicant: QINGDAO PICO TECHNOLOGY CO., LTD., Qingdao (CN)

(72) Inventor: Tao Wu, Shandong (CN)

(73) Assignee: QINGDAO PICO TECHNOLOGY CO., LTD., Shandong Province (CN)

( * ) Notice: Subject to any disclaimer, the term of this patent is extended or adjusted under 35 U.S.C. 154(b) by 0 days.

(21) Appl. No.: 17/881,555

(22) Filed: Aug. 4, 2022

(65) Prior Publication Data

US 2022/0383523 A1 Dec. 1, 2022

Related U.S. Application Data

(63) Continuation of application No. PCT/CN2021/122661, filed on Oct. 8, 2021.

(30) Foreign Application Priority Data

Feb. 18, 2021 (CN) .......................... 202110190108.1

(51) Int. Cl.
*G06K 9/00* (2022.01)
*G06T 7/292* (2017.01)
(Continued)

(52) U.S. Cl.
CPC .............. *G06T 7/292* (2017.01); *G06T 5/002* (2013.01); *G06T 7/248* (2017.01); *G06T 7/74* (2017.01);
(Continued)

(58) Field of Classification Search
CPC ......... G06T 7/292; G06T 5/002; G06T 7/248; G06T 7/74; G06T 2207/10016;
(Continued)

(56) References Cited

U.S. PATENT DOCUMENTS

2017/0140552 A1 5/2017 Woo et al.
2018/0285636 A1 10/2018 Fei et al.

FOREIGN PATENT DOCUMENTS

| CN | 109685797 A | 4/2019 | |
| CN | 111696140 A | * 9/2020 | ........... A63F 13/213 |

(Continued)

OTHER PUBLICATIONS

Raza, Muhammad, Vachiraporn Ketsoi, and Haopeng Chen. "An integrative approach to robust hand detection using CPM-YOLOv3 and RGBD camera in real time." 2019 IEEE Intl Conf on Parallel & Distributed Processing with Applications, pp. 1131-1138 (Year: 2019).*

(Continued)

*Primary Examiner* — Jonathan S Lee

(57) ABSTRACT

The present application provides a hand tracking method, device and system, wherein the method comprises: determining a current frame image corresponding to each tracking camera respectively; acquiring tracking information of a hand location corresponding to the to-be-detected frame image and two-dimensional coordinates of a preset quantity of skeleton points according to the current frame images and the tracking information of the last frame image of the current frame images; determining three-dimensional coordinates of the preset quantity of skeleton points according to the two-dimensional coordinates and pre-acquired tracking data of a head location corresponding to the hand location; carrying out smoothing filter processing on the three-dimensional coordinates of the skeleton points and historical three-dimensional coordinates of the last frame image so as to acquire processed stable skeleton points; and fusing, rendering and displaying the stable skeleton points and the tracking data of the head location so as to complete tracking and display of the hand location.

20 Claims, 2 Drawing Sheets

(51) Int. Cl.
  *G06T 7/73* (2017.01)
  *G06T 7/246* (2017.01)
  *G06V 10/25* (2022.01)
  *G06V 10/82* (2022.01)
  *G06T 5/00* (2006.01)

(52) U.S. Cl.
  CPC ............ *G06V 10/25* (2022.01); *G06V 10/82* (2022.01); *G06T 2207/10016* (2013.01); *G06T 2207/20081* (2013.01); *G06T 2207/20084* (2013.01); *G06T 2207/20221* (2013.01); *G06T 2207/30201* (2013.01); *G06T 2207/30242* (2013.01)

(58) Field of Classification Search
  CPC . G06T 2207/20081; G06T 2207/20084; G06T 2207/20221; G06T 2207/30201; G06T 2207/30242; G06V 10/25; G06V 10/82
  USPC ......................................................... 382/103
  See application file for complete search history.

(56) References Cited

FOREIGN PATENT DOCUMENTS

| CN | 111696140 A | 9/2020 |
| CN | 112083800 A | 12/2020 |
| CN | 112083801 A | 12/2020 |
| CN | 112286343 A | 1/2021 |
| CN | 112927259 A | 6/2021 |

OTHER PUBLICATIONS

Gilbert, Andy, Simon Kalouche, and Patrick Slade. "Marker-less pose estimation." (2017). (Year: 2017).*

First Office Action dated Jul. 26, 2022 in Chinese Application No. 202110190108.1, with English translation (18 pages).

* cited by examiner

HAND TRACKING METHOD, DEVICE AND SYSTEM

CROSS-REFERENCE TO RELATED APPLICATION

This application is a continuation of PCT International Application No. PCT/CN2021/122661 filed on Oct. 8, 2021, which claims priority to Chinese Patent Application No. 202110190108.1, filed to the China National Intellectual Property Administration on Feb. 18, 2021 and entitled "a Multi-Camera-Based Bare Hand Tracking Display Method, Device and System", the content of which is hereby incorporated by reference in its entirety.

TECHNICAL FIELD

The present disclosure relates to the technical field of image detection, and particularly relates to a hand tracking method, device and system.

BACKGROUND

At present, Virtual Reality (VR)/Augmented Reality (AR)/Mixed Reality (MR) integrated devices have been increasingly used in our lives, with such main application scenes that when a user performs VR/AR/MR scene interaction, a multi-lens tracking camera of a headset automatically identifies some behavioral trajectory information of hands of the user, hand gesture instructions are detected by use of some behavioral trajectories of the hands and then serve as input information of an artificial virtual reality system to interact with virtual scenes.

Wherein, hand gesture identification is vital to the VR/AR/MR field, particularly in VR virtual game interaction, and has high requirements on precision, delay and environment compatible stability. Concerning the existing hand gesture identification in the VR/AR/MR field, it is achievable by mainly depending on an infrared binocular camera or a depth camera, e.g., in the dominating Inside-out tracking scheme, hand gesture identification is realized via one, two or more visual light cameras on a headset to track and perceive an external environment in real time and estimate location and pose information of the headset in a space in real time. Generally, to improve estimation accuracy about the location and pose information of the headset, mainstream schemes adopt two or more visual light cameras to track the pose of a head in real time to perform real-time high-process tracking.

It is seen from the above that, a hand gesture identification tracker, mainly referring to two infrared binocular cameras or a depth camera at current, needs to be added in the existing head-mounted integrated device for finger tracking. However, the above addition may cause the following several key problems in the VR/AR/MR field:
1. Cost is additionally increased. 2. Power consumption is additionally increased, to be specific, as the existing mainstream headset is of an integrated mode, and mainly depends on a battery for power supply, therefore, the power consumption of the whole system greatly influences duration of user interaction. 3. In addition to increased power consumption, heat dissipation is also a big challenge. 4. Complexity in structure design and ID challenges are improved. The head-mounted integrated device tends to be compact in size of a headset, light and convenient to wear, and free of discomfortableness even in long-time wearing of a user. 5. The matured and popular depth camera generally has a small FOV (Field of Vision) of about 80°, and the headset generally has an FOV of about 110°, that is to say, some motion trajectories of hands are easily untraceable, thereby influencing user experience.

SUMMARY

In view of the above problems, the present disclosure aims to provide a hand tracking method, device and system, so as to resolve the existing problems of high cost, high power consumption, big size, low accuracy of precision measurement, influenced user experience and the like in existing hand gesture identification or tracking.

The hand tracking method provided by the present disclosure comprises: acquiring frame image information of videos of multiple tracking cameras respectively, and determining a current frame image corresponding to each tracking camera respectively according to the frame image information; executing at least one of a detection module, a tracking module and a skeleton point identification module according to the current frame images, tracking information of a last frame image of the current frame images and a preset module execution sequence to acquire tracking information of a hand location corresponding to the to-be-detected frame image and two-dimensional coordinates of a preset quantity of skeleton points corresponding to the to-be-detected frame image; determining three-dimensional coordinates of the preset quantity of skeleton points according to the two-dimensional coordinates and pre-acquired tracking data of a head location corresponding to the hand location; carrying out smoothing filter processing on the three-dimensional coordinates of the skeleton points and historical three-dimensional coordinates of a same hand location of the last frame image, to acquire stable skeleton points of a processed hand location; and fusing, rendering and displaying the stable skeleton points and the tracking data of the head location successively to complete tracking and display of the hand location.

Besides, in at least one illustrative embodiment, a process of executing at least one of the detection module, the tracking module and the skeleton point identification module according to the current frame images and a detection result of the last frame image of the current frame images comprises: acquiring a quantity of hands detected in the last frame image according to the tracking information of the last frame image, wherein in a case where the quantity of the hands is less than 2, executing each of the detection module, the tracking module and the skeleton point identification module; and otherwise, in a case where the quantity of the hands is 2, executing each of the tracking module and the skeleton point identification module.

Besides, in at least one illustrative embodiment, the detection module is configured to detect and position a hand in the current frame images via a pre-trained hand detection model, acquire a hand location and an Region Of Interest (ROI) corresponding to the hand location, and send the hand location and the ROI corresponding to the hand location to the tracking module and the skeleton point identification module; the tracking module is configured to track a predicted ROI of a next frame image of the current frame images according to the ROI corresponding to the hand location and an optical flow tracking algorithm, and store tracking information corresponding to the predicted ROI to a hand tracking queue so as to update tracking information of the hand location; the skeleton point identification module is configured to acquire the ROI corresponding to the hand location from the hand tracking queue, and carrying out identification of the preset quantity of skeleton points on the acquired ROI via a pre-trained skeleton point identification module.

Besides, in at least one illustrative embodiment, the tracking data of the head location comprise location data of the head location and tracking data of pose data, wherein the location data and the pose data are determined by video data collected by a tracking camera arranged at a head and a pose estimation algorithm of the head.

Besides, in at least one illustrative embodiment, determining the three-dimensional coordinates of the preset quantity of the skeleton points comprises: determining any skeleton point in the skeleton points of the current frame as a target skeleton point, and acquiring three-dimensional coordinates of the target skeleton point; determining three-dimensional coordinates of all skeleton points according to the three-dimensional coordinates of the target skeleton point, wherein the three-dimensional coordinates of the target skeleton point are determined by using the following formula:

$$P2 = R*P1 + T$$

wherein P2 represents the three-dimensional coordinates of the target skeleton point, P1 represents historical three-dimensional coordinates of the target skeleton point in the last frame image, R represents a rotation matrix of the head location of the current frame in the tracking data of the head location relative to the head location of the last frame image, and T represents a transfer matrix of the head location of the current frame in the tracking data of the head location relative to the head location of the last frame image.

Besides, in at least one illustrative embodiment, wherein the three-dimensional coordinates of the target skeleton point are calculated by using the following formula:

$$Z1 * \begin{pmatrix} u1 \\ v1 \\ 1 \end{pmatrix} = \begin{bmatrix} fx & 0 & cx \\ 0 & fy & cy \\ 0 & 0 & 1 \end{bmatrix} * \begin{pmatrix} X1 \\ Y1 \\ Z1 \end{pmatrix}$$

$$Z2 * \begin{pmatrix} u2 \\ v2 \\ 1 \end{pmatrix} = \begin{bmatrix} fx & 0 & cx \\ 0 & fy & cy \\ 0 & 0 & 1 \end{bmatrix} * \begin{pmatrix} X2 \\ Y2 \\ Z2 \end{pmatrix}$$

$$Z2 * K^{-1} * \begin{pmatrix} u2 \\ v2 \\ 1 \end{pmatrix} = R * Z1 * K^{-1} * \begin{pmatrix} u1 \\ v1 \\ 1 \end{pmatrix} + T$$

$$P2 = K^{-1} * \begin{pmatrix} u2 \\ v2 \\ 1 \end{pmatrix} * Z2$$

wherein, $$P2 = \begin{pmatrix} X2 \\ Y2 \\ Z2 \end{pmatrix}$$

represents the three-dimensional coordinates P2 of the target skeleton point of the current frame;

$$L2 = \begin{pmatrix} u2 \\ v2 \\ 1 \end{pmatrix}$$

represents two-dimensional coordinates of the target skeleton point of the current frame;

$$P1 = \begin{pmatrix} X1 \\ Y1 \\ Z1 \end{pmatrix}$$

represents the historical three-dimensional coordinates P1 of the target skeleton point of the last frame image;

$$L1 = \begin{pmatrix} u1 \\ v1 \\ 1 \end{pmatrix}$$

represents two-dimensional coordinates of the target skeleton point of the last frame image; and $$k = \begin{bmatrix} fx & 0 & cx \\ 0 & fy & cy \\ 0 & 0 & 1 \end{bmatrix}$$

represents acquired calibration parameters of the tracking cameras of the videos; wherein fx and fy represent pixel focal lengths, cx and cy represent coordinate locations of optical axes of the tracking cameras in the current frame images; R represents a rotation matrix of the head location of the current frame in the tracking data of the head location relative to the head location of the last frame image; and T represents a transfer matrix of the head location of the current frame in the tracking data of the head location relative to the head location of the last frame image.

Besides, in at least one illustrative embodiment, a pre-training process of the hand detection model comprises: annotating a target region in acquired training image data, and acquiring annotated location information, wherein the target region is a hand region; carrying out parameter training on the annotated location information by using a yolo model until the yolo model converges within a corresponding preset range to complete training of the hand detection model.

Besides, in at least one illustrative embodiment, a pre-training process of the skeleton point identification model comprises: training a basic neural network model based on the training image data until the neural network model converges within a corresponding preset range to complete training of the skeleton point identification model, wherein the basic neutral network model comprises: a yolo model, a CNN model, an SSD model or an FPN model.

Besides, in at least one illustrative embodiment, the training image data are acquired by multiple tracking fisheye cameras on a head-mounted integrated device.

Besides, the present disclosure further provides an electronic device. The electronic device includes: a memory, a processor and an imaging device, the memory includes a hand tracking program implementing the steps of the hand tracking method as shown above when executed by the processor.

Besides, the present disclosure further provides a hand tracking system, comprising: a to-be-detected frame image determination unit configured to acquire frame image information of videos of multiple tracking cameras respectively, and determine a current frame image corresponding to each tracking camera respectively according to the frame image information; a two-dimensional coordinate acquiring unit configured to selectively start a detection module, a tracking module and a skeleton point identification module according to the current frame images, tracking information of a last frame image of the current frame images and a preset module execution sequence so as to acquire tracking information of a hand location corresponding to the to-be-detected frame image and two-dimensional coordinates of a preset quantity of skeleton points corresponding to the to-be-detected frame image; a three-dimensional coordinate determination unit configured to determine three-dimensional coordinates of the preset quantity of skeleton points according to the two-dimensional coordinates and pre-acquired tracking data of a head location corresponding to the hand location; a stable skeleton point acquiring unit configured to carry out smoothing filter processing on the three-dimensional coordinates of the skeleton points and historical three-dimensional coordinates of a same hand location of the last frame image so as to acquire stable skeleton points of a processed hand location; and a tracking display unit configured to fuse, render and display the stable skeleton points and the tracking data of the head location successively so as to complete tracking and display of the hand location.

According to another aspect of the present disclosure, it provides a computer-readable storage medium having a computer program stored thereon, the computer program implementing the hand tracking method of any of the above embodiments when executed by the processor.

By using the above hand tracking method, device and system, bare hand three-dimensional finger pose estimation can be carried out based on tracking cameras of a head, pose location information of a hand of a user in a virtual scene can be restored and displayed with high precision and stability, cost is low, size is small, and user experience is remarkable.

To achieve the above and relevant objects, one or more aspects of the present disclosure include features described in detail below. The description below and the appended drawings serve for the purpose of detailed explanations of some illustrative aspects of the present application. However, these aspects merely refer to some of various modes making use of the principles of the present application. Besides, the present disclosure intends to include all these aspects and their equivalents.

BRIEF DESCRIPTION OF THE DRAWINGS

By referring to explanations in combination with the following appended drawings, other objects and results of the present disclosure become more clear and easily understandable with a comprehensive understanding of the present disclosure. In the drawings.

Same reference signs represent similar or corresponding features or functions throughout the drawings.

DETAILED DESCRIPTION OF THE EMBODIMENTS

In the following description, for the purpose of explanation, more specific details are disclosed to provide a comprehensive understanding about one or more embodiments. However, it is apparent that, these embodiments may also be carried out without these specific details. In other examples, known structures and apparatuses are shown in the form of block diagrams so as to conveniently depict one or more embodiments.

To clearly describe the hand tracking method, device and system, detailed description will be given in the following specific embodiments of the present application in conjunctions with the appended drawings.

Figure 1:
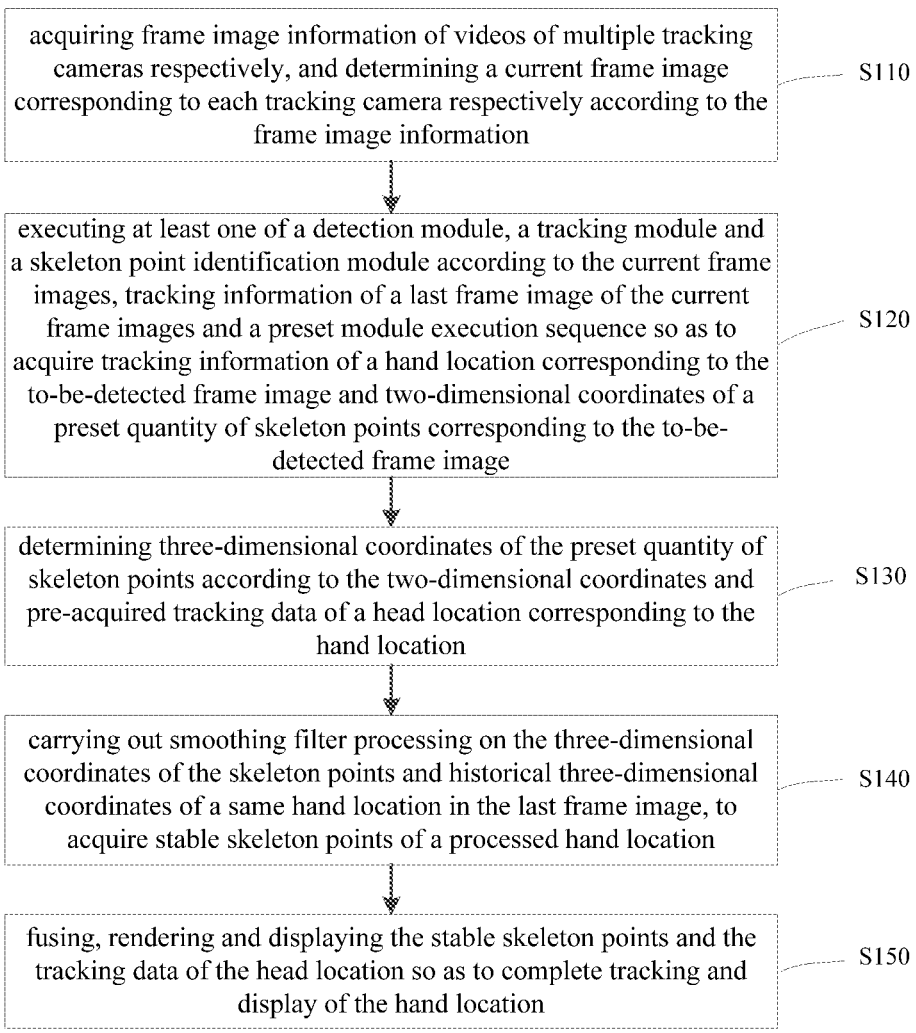
FIG. 1 is a flow diagram of a hand tracking method according to embodiments of the present application.

FIG. 1 shows a process of a hand tracking method according to embodiments of the present application.

With reference to FIG. 1, the hand tracking method according to embodiments of the present application includes:

S110: acquiring frame image information of videos of multiple tracking cameras respectively, and determining a current frame image corresponding to each tracking camera respectively according to the frame image information.

As a specific example, the multiple tracking cameras in the present disclosure may include head tracking cameras and multiple fisheye tracking cameras, e.g., a four-lens monochromatic fisheye tracking camera is disposed on a head-mounted integrated device. On the premise of ensuring the tracking range of the head-mounted integrated device under 6DoF (degree of freedom) and the tracking range (170°*160° or above) of bare hand interaction, arrangement of the four-lens monochromatic fisheye tracking camera on the head-mounted integrated device prefers meeting the following conditions: the visual interaction area of every two lenses of the four-lens monochromatic fisheye tracking camera is as large as possible, the least interaction area of two lenses of the four-lens monochromatic fisheye tracking camera is 95°*80° or above, and the four lenses can be spliced into an area of 143°*120° or above.

Concretely, the monochromatic fisheye tracking camera provided by the present disclosure has the following parameters: FOV: 143°*107°*163° (H*V*D); resolution: 640*480; frame rate: 30 Hz; exposure mode: global shutter; color pass: monochrome.

It should be noted that, the quantity, locations and specific parameters of the above fisheye tracking cameras can be disposed and adjusted according to application scenes or requirements, which is not limited to the abovementioned specific parameter data.

S120: executing at least one of a detection module, a tracking module and a skeleton point identification module according to the current frame images, tracking information of a last frame image of the current frame images and a preset module execution sequence so as to acquire tracking information of a hand location corresponding to the to-be-detected frame image and two-dimensional coordinates of a preset quantity of skeleton points corresponding to the to-be-detected frame image.

In this step, a process of executing at least one of a detection module, a tracking module and a skeleton point identification module according to the current frame images and a detection result of the last frame image of the current frame images includes: acquiring a quantity of hands detected in the last frame image according to the tracking information of the last frame image, wherein in a case where the quantity of the hands is less than 2, it indicates that two hands of a user are not detected or are not detected at the same time, and at this time, the detection module, the tracking module and the skeleton point identification module all need to be executed; and otherwise, in a case where the quantity of the hands is 2, the tracking module and the skeleton point identification module both need to be executed.

Concretely, the detection module is configured to detect and position a hand in the current frame images via a pre-trained hand detection model, acquire a hand location and ROI (Region Of Interest) corresponding to the hand location, and send the hand location and the ROI to the tracking module and the skeleton point identification module, and the ROI can be sent to a tracking message queue of the tracking module and a tracking message queue of the skeleton point identification module.

Wherein, the tracking module is configured to track a predicated ROI of a next frame image of the current frame images according to the ROI and an optical flow tracking algorithm, and store tracking information corresponding to the predicted ROI to a hand tracking queue to update tracking information of the hand location, and provide tracking information for identification of three-dimensional skeleton points of the hand location of the next frame image, wherein the optical flow tracking algorithm is a classic algorithm in the physical tracking field, and can be described by referring to relative contents in the prior art.

Wherein, the skeleton point identification module is configured to acquire an ROI of the hand location from the hand tracking queue, and carry out skeleton point identification of the preset quantity of skeleton points on the acquired ROI via the pre-trained skeleton point identification model. The skeleton point identification module may adopt relevant data of the tracking module, or the skeleton point identification module and the tracking module are arranged in parallel, i.e., the skeleton point identification module and the tracking module are synchronous.

It should be noted that, the skeleton point identification module, in a case where acquiring an ROI of a hand location, may acquire from a tracking message queue of the tracking module, or acquire from a tracking message queue of the skeleton point identification module sent by the detection module, the tracking module for acquiring an ROI is configured to update tracking information of a hand location and provide relevant data for a next frame image. The skeleton point identification module is configured to use the ROI to carry out point identification on the to-be-detected frame image data of a corresponding region.

Concretely, the preset quantity of skeleton points includes 21 skeleton points, further the 21 skeleton points include 3 skeleton points of each finger, 1 fingertip skeleton point and 1 palm point of a hand, i.e., the 21 skeleton points of the hand are respectively distributed on 4 skeleton points (3 articulated points and 1 skeleton point at a fingertip) of each finger and a skeleton point of a palm.

Besides, smoothing filter processing is carried out on the 21 skeleton points and historical skeleton points of a corresponding hand location so as to resolve the problem that some articulated point in a certain frame is unstable and further improve precision and stability of finger skeleton point identification. Meanwhile, location and pose tracking data of a head in each frame image are counted and stored in a tracking message queue in real time. Moreover, specific quantity and locations of the preset quantity of skeleton points can be disposed or adjusted according to application scenes or requirements.

S130: determining three-dimensional coordinates of the preset quantity of skeleton points according to the two-dimensional coordinates and pre-acquired tracking data of a head location corresponding to the hand location.

Wherein, according to the above steps and module operation, corresponding operations are performed on all other fisheye tracking cameras so as to acquire two-dimensional coordinates of the 21 skeleton points in all other fisheye tracking cameras of a hand. As how each hand moves before a head-mounted integrated device is uncertain, a corresponding image location of the hand of a user in a four-lens (fisheye) tracking camera is also uncertain. Therefore, it is possible that the 21 skeleton points of the hand coexist in tracking images of two or more cameras; it is also possible that a part of the 21 skeleton points of the hand coexist in images of two lenses of the tracking camera, while the other points coexist in images of the other 2 lenses of the tracking camera; it is further possible that a part of the 21 skeleton points of the hand coexist in images of 3 lenses of the tracking camera, and a part of the skeleton points coexist in images of 2 lenses of the tracking camera.

Therefore, three-dimensional skeleton point coordinate transformation needs to be carried out on the two-dimensional coordinates.

Concretely, the tracking data of the head location include location data of the head location and tracking data of pose data, wherein the location data and the pose data are determined by video data collected by a tracking camera arranged at a head and a pose estimation algorithm of the head.

A process of determining the three-dimensional coordinates of a preset quantity of skeleton points includes: determining any skeleton point in the skeleton points of the current frame as a target skeleton point, and acquiring three-dimensional coordinates of the target skeleton point; determining three-dimensional coordinates of all skeleton points according to the three-dimensional coordinates of the target skeleton point, wherein the three-dimensional coordinates of the target skeleton point are determined using the following formula:

$$P2 = R*P1 + T$$

wherein P2 represents the three-dimensional coordinates of the target skeleton point, P1 represents the historical three-dimensional coordinates of the target skeleton point in the last frame image, R represents a rotation matrix of the head location of the current frame in the tracking data of the head location relative to the head location of the last frame image, and T represents a transfer matrix of the head location of the current frame in the tracking data of the head location relative to the head location of the last frame image.

The three-dimensional coordinates of the target skeleton point are calculated by using the following formula:

$$Z1 * \begin{pmatrix} u1 \\ v1 \\ 1 \end{pmatrix} = \begin{bmatrix} fx & 0 & cx \\ 0 & fy & cy \\ 0 & 0 & 1 \end{bmatrix} * \begin{pmatrix} X1 \\ Y1 \\ Z1 \end{pmatrix}$$

$$Z2 * \begin{pmatrix} u2 \\ v2 \\ 1 \end{pmatrix} = \begin{bmatrix} fx & 0 & cx \\ 0 & fy & cy \\ 0 & 0 & 1 \end{bmatrix} * \begin{pmatrix} X2 \\ Y2 \\ Z2 \end{pmatrix}$$

$$Z2^* K^{-1} * \begin{pmatrix} u2 \\ v2 \\ 1 \end{pmatrix} = R * Z1 * K^{-1} * \begin{pmatrix} u1 \\ v1 \\ 1 \end{pmatrix} + T$$

$$P2 = K^{-1} * \begin{pmatrix} u2 \\ v2 \\ 1 \end{pmatrix} * Z2$$

wherein, $$P2 = \begin{pmatrix} X2 \\ Y2 \\ Z2 \end{pmatrix}$$

represents the three-dimensional coordinates P2 of the target skeleton point of the current frame;

$$L2 = \begin{pmatrix} u2 \\ v2 \\ 1 \end{pmatrix}$$

represents the two-dimensional coordinates of the target skeleton point of the current frame;

$$P1 = \begin{pmatrix} X1 \\ Y1 \\ Z1 \end{pmatrix}$$

represents the historical three-dimensional coordinates P1 of the target skeleton point of the last frame image;

$$L1 = \begin{pmatrix} u1 \\ v1 \\ 1 \end{pmatrix}$$

represents the two-dimensional coordinates of the target skeleton point of the last frame image; and $$k = \begin{bmatrix} fx & 0 & cx \\ 0 & fy & cy \\ 0 & 0 & 1 \end{bmatrix}$$

represents acquired calibration parameters of the tracking cameras of the videos; wherein fx and fy represent pixel focal lengths, cx and cy represent coordinate locations of optical axes of the tracking cameras in the current frame images; R represents a rotation matrix of the head location of the current frame in the tracking data of the head location relative to the head location of the last frame image; and T represents a transfer matrix of the head location of the current frame in the tracking data of the head location relative to the head location of the last frame image.

Based on the deduction of the above formulas, three-dimensional coordinate locations of the 21 skeleton points of the hand location under a same tracking camera can be acquired, by judging the quantity of two-dimensional coordinate data of common-view camera images of each skeleton point of the 21 skeleton points of the hand location, the quantity of two-dimensional coordinates (image data) can be obtained, then a corresponding quantity of three-dimensional coordinate locations can be calculated, and further all three-dimensional coordinate locations are averaged to enhance detection precision of the three-dimensional locations. If the skeleton points have more common-view cameras, the precision of the three-dimensional coordinate locations of the skeleton points becomes higher, and four three-dimensional coordinate data can be obtained at most.

S140: carrying out smoothing filter processing on the three-dimensional coordinates of the skeleton points and historical three-dimensional coordinates of a same hand location in the last frame image, to acquire stable skeleton points of a processed hand location.

Wherein, by using the algorithm in the above step, three-dimensional locations of the other 20 skeleton points of each hand in the to-be-detected image of the current frame are successively acquired, i.e., coordinate information of the 21 three-dimensional skeleton points of each hand can be acquired, and then smoothing filter processing is carried out on the three-dimensional coordinates of the 21 skeleton points of each hand and historical three-dimensional coordinates of the skeleton points of a corresponding hand location so as to resolve the problem that some articulated point in a certain frame is unstable to identify and further improve identification precision and stability of three-dimensional skeleton point locations of fingers.

S150: fusing, rendering and displaying the stable skeleton points and the tracking data of the head location so as to complete tracking and display of the hand location.

Concretely, the 21 skeleton points of each hand subjected to smoothing filter processing and the tracking data of the head location of a user sent by the head-mounted integrated device are fused, skeleton point information of a hand under a camera coordinate system is sent to the skeleton points of the hand under a coordinate system of the head-mounted integrated device, the data then are transmitted to Unity (user interface) and then passed back to the head-mounted integrated device in real time by rendering the current frame for display.

In a specific embodiment of the present application, a pre-training process of the hand detection model includes: annotating a target region in acquired training image data, and acquiring annotated location information, wherein the target region is a hand region; carrying out parameter training on the annotated location information by using a yolo model until the yolo model converges within a corresponding preset range to complete training of the hand detection model.

It is found that, the hand detection model may adopt other neural network models for training, which is not limited to the above specific training process.

Besides, a pre-training process of the skeleton point identification model includes: training a basic neural network model based on the training image data until the neural network model converges within a corresponding preset range to complete training of the skeleton point identification model, wherein the basic neutral network model includes: a yolo model, a CNN model, an SSD model or an FPN model.

In the above training processes of two models, training image data can be acquired via multiple tracking fisheye cameras on a head-mounted integrated device, e.g., image data can be acquired by collecting a total of one million of images from 100 users through the tracking fisheye cameras, input image data of the hand detection model and the skeleton point identification model are data of the tracking cameras of a head of the head-mounted integrated device. If one tracking camera is used at a head for head pose tracking, each frame transmitted to the hand detection model and the skeleton point identification model refers to data of one image, and if multiple tracking cameras are used for head pose tracking, each frame transmitted to the hand detection model and the skeleton point identification model refers to data of multiple images. According to the present application, a binocular camera and a multi-lens camera are used to resolve the problem in estimation of three-dimensional skeleton points of a hand, thereby improving three-dimensional skeleton tracking stability and tracking precision of the hand location.

Corresponding to the hand tracking method, the present application further provides a hand tracking system.

Figure 2:
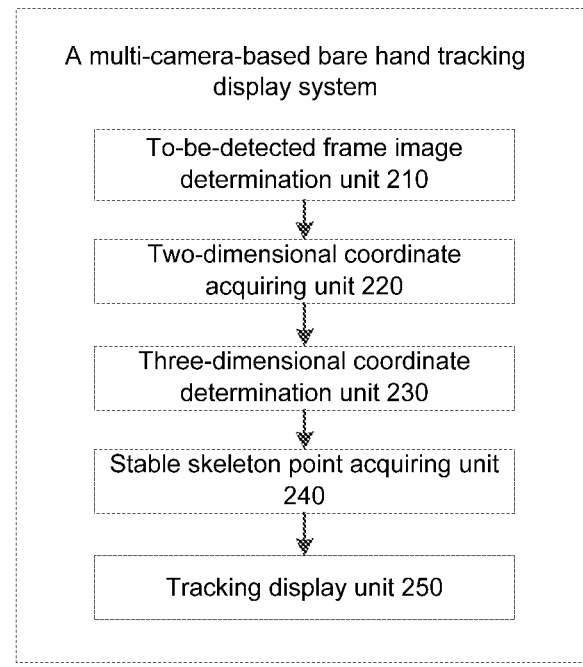
FIG. 2 is a block diagram of the hand tracking method according to embodiments of the present application.

Concretely, with reference to FIG. 2, the hand tracking system, includes:

a to-be-detected frame image determination unit 210 configured to acquire frame image information of videos of multiple tracking cameras respectively, and determine a current frame image corresponding to each tracking camera respectively according to the frame image information; a two-dimensional coordinate acquiring unit 220 configured to selectively start a detection module, a tracking module and a skeleton point identification module according to the current frame images, tracking information of a last frame image of the current frame images and a preset module execution sequence so as to acquire tracking information of a hand location corresponding to the to-be-detected frame image and two-dimensional coordinates of a preset quantity of skeleton points corresponding to the to-be-detected frame image; a three-dimensional coordinate determining unit 230 configured to determine three-dimensional coordinates of the preset quantity of skeleton points according to the two-dimensional coordinates and tracking data of a pre-acquired head location corresponding to the hand location; a stable skeleton point acquiring unit 240 configured to carry out smoothing filter processing on the three-dimensional coordinates of the skeleton points and historical three-dimensional coordinates of a same hand location of the last frame image so as to acquire stable skeleton points of a processed hand location; and a tracking display unit 250 configured to fuse, render and display the stable skeleton points and the tracking data of the head location successively so as to complete tracking and display of the hand location.

Figure 3:
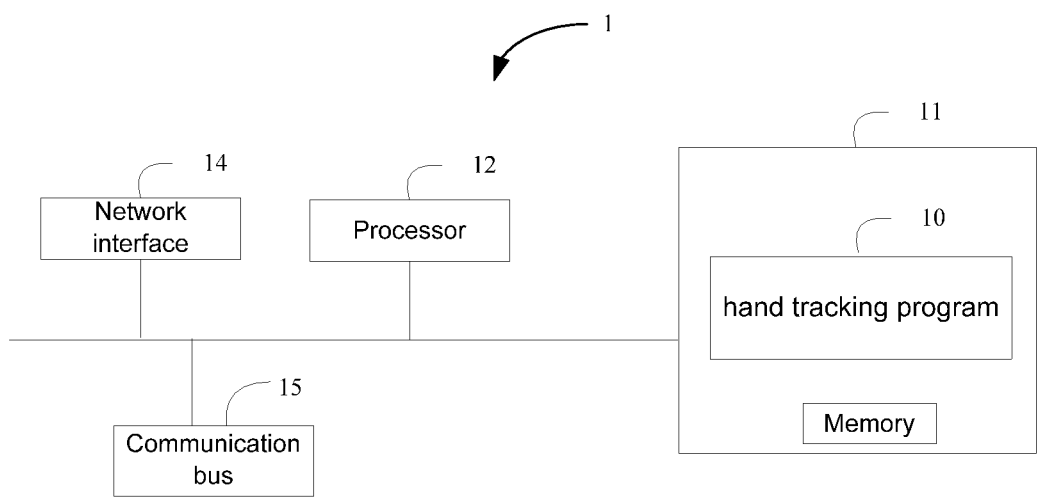
FIG. 3 is a logic diagram of an electronic device according to embodiments of the present application.

Accordingly, the present application further provides an electronic device. FIG. 3 shows a schematic structure of the electronic device according to embodiments of the present application.

With reference to FIG. 3, the electronic device 1 in the present application is a terminal device with an operation function, selected from a group of a VR/AR/MR head-mounted integrated device, a server, an intelligent phone, a tablet computer, a portable computer, a desktop computer or the like. Wherein, the electronic device 1 includes a processor 12, a memory 11, a network interface 14 and a communication bus 15.

Wherein, the memory 11 includes at least one type of readable storage medium. The at least one type of readable storage medium may be a flash memory, a hard disk, a multimedia card, a card type memory 11 or other nonvolatile media. In some embodiments, the readable storage medium may be an internal memory unit of the electronic device 1, e.g., a hard disk of the electronic device 1. In other embodiments, the readable storage medium may be an external memory unit 11 of the electronic device 1, e.g., the electronic device 1 is equipped with a plug-in hard disk, a smart media card (SMC), a secure digital (SD) card, a flash card or the like.

In the embodiment, the readable storage medium of the memory 11 is generally set to be stored in a hand tracking program 10 of the electronic device 1. The memory 11 also can be set to temporarily store data that have been output or will be output.

The processor 12 in some embodiments may be a central processing unit (CPU), a microprocessor or other data processing chips, and is set to run program codes stored in the memory 11 or process data, e.g., to execute the hand tracking program 10.

The network interface 14 optionally includes a standard wired interface or wireless interface (e.g., WI-FI interface), and is generally set to establish a communication connection between the electronic device 1 and other electronic devices.

The communication bus 15 is set to achieve connection communication among these components.

FIG. 1 merely shows the electronic device 1 with components 11-15. However, it should be understood that, not all shown components need to be implemented, instead more or less components can be alternatively implemented.

Optionally, the electronic device 1 further includes a user interface that includes an input unit (e.g., a keyboard), any device with a voice recognition function such as a voice input device (e.g., a microphone), a voice output device such as a sound, an earphone or the like. Optionally, the user interface may further include a standard wired interface or wireless interface.

Optionally, the electronic device 1 may include a display that is called a display screen or display unit. In some embodiments, it may be an LED, a liquid crystal display, a touch liquid crystal display, an organic light-emitting diode touch device or the like. The display is set to display information processed in the electronic device 1 and display a visualized user interface.

Optionally, the electronic device 1 may include a touch sensor. The region for touch operation of a user provided by the touch sensor is a touch region. Besides, the touch sensor may be a resistance-type touch sensor, a capacitance-type touch sensor or the like. Moreover, the touch sensor may include not only a contact touch sensor but also a proximity touch sensor. Besides, the touch sensor may be a single sensor or multiple sensors arranged in the form of an array.

In the device embodiment as shown in FIG. 1, the memory 11 as a computer-readable storage medium may include an operation system and a hand tracking program 10. The processor 12 implements the steps of the hand tracking method when executing the hand tracking program 10 stored in the memory 11.

The specific embodiments of the computer-readable storage medium of the present application are substantially similar to those of the hand gesture detection identification program method, device and system mentioned above, and thus are not repeated.

The embodiment of the present application further provides a computer-readable storage medium having a computer program stored thereon, and the computer program implements the hand tracking method provided by any of the above embodiments when executed by the processor.

It should be explained that, in the context, the terms "include", "comprise" or any other variations thereof have meanings in a non-exclusive sense so that a process, device, article or method with a series of elements not only includes these elements but also other elements that are not explicitly listed, or further includes intrinsic elements of the process, device, article or method. In case of no more restrictions, an element defined by the wording "include one" does not exclude other same elements in the process, device, article or method that includes the element.

The serial numbers of the above embodiments of the present application merely serve for the purpose of description, and are not intended to give a priority to these embodiments. By the description about the above embodiments, those skilled in the art may clearly understand that the foregoing method embodiment can be achieved through software and a necessary general hardware platform or through hardware, however, in most cases, the former is a preferred embodiment. Based on this understanding, the technical solution of the present application in essence or its portions contributive to the prior art can be embodied in the form of a software product. The computer software product stored in a memory medium (e.g., ROM/RAM, diskette, light disk or the like) as mentioned above, includes multiple instructions used to enable one terminal device (e.g., a mobile phone, a computer, a server, a network device or the like) to execute the method as stated in each embodiment of the present application.

The hand tracking method, device and system according to the present application are described in the form of examples in conjunction with the appended drawings. However, it should be understood that, for the hand tracking method, device and system according to the present application, various improvements are appreciated without departing from the contents of the present application. Therefore, the protection scope of the present application should be determined by the appended claims.

The invention claimed is:

1. A hand tracking method, comprising:
   acquiring frame image information of videos of multiple tracking cameras respectively, and determining a current frame image corresponding to each tracking camera respectively according to the frame image information, wherein the multiple tracking cameras comprises head tracking cameras and multiple fisheye tracking cameras;
   executing at least one of a detection module, a tracking module and a skeleton point identification module according to the current frame image, tracking information of a last frame image of the current frame image and a preset module execution sequence, to acquire tracking information of a hand location corresponding to the current frame image and two-dimensional coordinates of a preset quantity of skeleton points corresponding to the current frame image, wherein the skeleton point identification module and the tracking module are synchronously executed;
   determining three-dimensional coordinates of the preset quantity of skeleton points according to the two-dimensional coordinates and pre-acquired tracking data of a head location corresponding to the hand location;
   for each skeleton point of the preset quantity of skeleton points, determining common-view camera images of the each skeleton point, and averaging the three-dimensional coordinates corresponding to the tracking cameras of the common-view camera images of the each skeleton point according to a quantity of the common-view camera images, to obtain three-dimensional coordinates of the each skeleton point;
   carrying out smoothing filter processing on the three-dimensional coordinates of the skeleton points and historical three-dimensional coordinates of a same hand location of the last frame image, to acquire stable skeleton points of a processed hand location; and
   fusing, rendering and displaying the stable skeleton points and the tracking data of the head location successively, to complete tracking and display of the hand location.

2. The hand tracking method according to claim 1, wherein executing at least one of the detection module, the tracking module and the skeleton point identification module according to the current frame image and the detection result of the last frame image of the current frame image comprises:
   acquiring a quantity of hands detected in the last frame image according to the tracking information of the last frame image; wherein,
   in a case where the quantity of the hands is less than 2, executing each of the detection module, the tracking module and the skeleton point identification module;
   and otherwise, in a case where the quantity of the hands is 2, executing each of the tracking module and the skeleton point identification module.

3. The hand tracking method according to claim 2, wherein
   the detection module is configured to detect and position a hand in the current frame image via a pre-trained hand detection model, acquire a hand location and an Region Of Interest (ROI) corresponding to the hand location, and send the hand location and the ROI corresponding to the hand location to the tracking module and the skeleton point identification module;
   the tracking module is configured to track a predicted ROI of a next frame image of the current frame image according to the ROI corresponding to the hand location and an optical flow tracking algorithm, and store tracking information corresponding to the prediction ROI to a hand tracking queue so as to update tracking information of the hand location;
   the skeleton point identification module is configured to acquire the ROI corresponding to the hand location from the hand tracking queue, and carrying out identification of the preset quantity of skeleton points on the acquired ROI via a pre-trained skeleton point identification model.

4. The hand tracking method according to claim 3, wherein
   a pre-training process of the hand detection model comprises:
   annotating a target region in acquired training image data, and acquiring annotated location information; wherein the target region is a hand region;
   carrying out parameter training on the annotated location information by using a yolo model until the yolo model converges within a corresponding preset range to complete training of the hand detection model.

5. The hand tracking method according to claim 4, wherein a pre-training process of the skeleton point identification model comprises:
   training a basic neural network model based on the training image data until the neural network model converges within a corresponding preset range to complete training of the skeleton point identification model; wherein
   the basic neutral network model comprises: a yolo model, a CNN model, an SSD model or an FPN model.

6. The hand tracking method according to claim 4, wherein the training image data are acquired by multiple tracking fisheye cameras on a head-mounted integrated device.

7. An electronic device, the electronic device comprising: a memory, a processor and an image pick-up device, the memory comprising a hand tracking program implementing the steps of the hand tracking method according to claim 3 when executed by the processor.

8. A non-transitory computer-readable storage medium stored with a computer program thereon, the computer program implementing the method of claim 3 when executed by the processor.

9. An electronic device, the electronic device comprising: a memory, a processor and an image pick-up device, the memory comprising a hand tracking program implementing the steps of the hand tracking method according to claim 2 when executed by the processor.

10. A non-transitory computer-readable storage medium stored with a computer program thereon, the computer program implementing the method of claim 2 when executed by the processor.

11. The hand tracking method according to claim 1, wherein
the tracking data of the head location comprise location data of the head location and tracking data of pose data; wherein
the location data and the pose data are determined by video data collected by a tracking camera arranged at a head and a pose estimation algorithm of the head.

12. An electronic device, the electronic device comprising: a memory, a processor and an image pick-up device, the memory comprising a hand tracking program implementing the steps of the hand tracking method according to claim 11 when executed by the processor.

13. A non-transitory computer-readable storage medium stored with a computer program thereon, the computer program implementing the method of claim 11 when executed by the processor.

14. The hand tracking method according to claim 1, wherein determining the three-dimensional coordinates of the preset quantity of the skeleton points comprises:
determining any skeleton point in the skeleton points of the current frame as a target skeleton point, and acquiring three-dimensional coordinates of the target skeleton point;
determining three-dimensional coordinates of all skeleton points according to the three-dimensional coordinates of the target skeleton point; wherein
the three-dimensional coordinates of the target skeleton point are determined by using a following formula:

$$P2 = R*P1 + T$$

wherein P2 represents the three-dimensional coordinates of the target skeleton point, P1 represents historical three-dimensional coordinates of the target skeleton point of the last frame image, R represents a rotation matrix of the head location of the current frame in the tracking data of the head location relative to the head location of the last frame image, and T represents a transfer matrix of the head location of the current frame in the tracking data of the head location relative to the head location of the last frame image.

15. The hand tracking method according to claim 14, wherein
the three-dimensional coordinates of the target skeleton point are calculated by using a following formula:

$$Z1 * \begin{pmatrix} u1 \\ v1 \\ 1 \end{pmatrix} = \begin{bmatrix} fx & 0 & cx \\ 0 & fy & cy \\ 0 & 0 & 1 \end{bmatrix} * \begin{pmatrix} X1 \\ Y1 \\ Z1 \end{pmatrix}$$

$$Z2 * \begin{pmatrix} u2 \\ v2 \\ 1 \end{pmatrix} = \begin{bmatrix} fx & 0 & cx \\ 0 & fy & cy \\ 0 & 0 & 1 \end{bmatrix} * \begin{pmatrix} X2 \\ Y2 \\ Z2 \end{pmatrix}$$

$$Z2^* K^{-1} * \begin{pmatrix} u2 \\ v2 \\ 1 \end{pmatrix} = R * Z1 * K^{-1} * \begin{pmatrix} u1 \\ v1 \\ 1 \end{pmatrix} + T$$

$$P2 = K^{-1} * \begin{pmatrix} u2 \\ v2 \\ 1 \end{pmatrix} * Z2$$

wherein, $$P2 = \begin{pmatrix} X2 \\ Y2 \\ Z2 \end{pmatrix}$$

represents the three-dimensional coordinates P2 of the target skeleton point of the current frame;

$$L2 = \begin{pmatrix} u2 \\ v2 \\ 1 \end{pmatrix}$$

represents two-dimensional coordinates of the target skeleton point of the current frame;

$$P1 = \begin{pmatrix} X1 \\ Y1 \\ Z1 \end{pmatrix}$$

represents the historical three-dimensional coordinates P1 of the target skeleton point of the last frame image;

$$L1 = \begin{pmatrix} u1 \\ v1 \\ 1 \end{pmatrix}$$

represents two-dimensional coordinates of the target skeleton point of the last frame image; and $$k = \begin{bmatrix} fx & 0 & cx \\ 0 & fy & cy \\ 0 & 0 & 1 \end{bmatrix}$$

represents acquired calibration parameters of the tracking cameras of the videos; wherein fx and fy represent pixel focal lengths, cx and cy represent coordinate locations of optical axes of the tracking cameras in the current frame image; R represents a rotation matrix of the head location of the current frame in the tracking data of the head location relative to the head location of the last frame image; and T represents a transfer matrix of the head location of the current frame in the tracking data of the head location relative to the head location of the last frame image.

16. An electronic device, the electronic device comprising: a memory, a processor and an image pick-up device, the memory comprising a hand tracking program implementing the steps of the hand tracking method according to claim 14 when executed by the processor.

17. A non-transitory computer-readable storage medium stored with a computer program thereon, the computer program implementing the method of claim 14 when executed by the processor.

18. An electronic device, the electronic device comprising: a memory, a processor and an image pick-up device, the memory comprising a hand tracking program implementing the steps of the hand tracking method according to claim 1 when executed by the processor.

19. A non-transitory computer-readable storage medium stored with a computer program thereon, the computer program implementing the method of claim 1 when executed by the processor.

20. A hand tracking system, comprising a memory storing instructions and a processor in communication with the memory, wherein the processor is configured to execute the instructions to:
- acquire frame image information of videos of multiple tracking cameras respectively, and determine a current frame image corresponding to each tracking camera respectively according to the frame image information, wherein the multiple tracking cameras comprises head tracking cameras and multiple fisheye tracking cameras;
- execute at least one of a detection module, a tracking module and a skeleton point identification module according to the current frame image, tracking information of a last frame image of the current frame image and a preset module execution sequence, to acquire tracking information of a hand location corresponding to the current frame image and two-dimensional coordinates of a preset quantity of skeleton points corresponding to the current frame image, wherein the skeleton point identification module and the tracking module are synchronously executed;
- determine three-dimensional coordinates of the preset quantity of skeleton points according to the two-dimensional coordinates and pre-acquired tracking data of a head location corresponding to the hand location;
- for each skeleton point of the preset quantity of skeleton points, determine common-view camera images of the each skeleton point, and average the three-dimensional coordinates corresponding to the tracking cameras of the common-view camera images of the each skeleton point according to a quantity of the common-view camera images, to obtain three-dimensional coordinates of the each skeleton point;
- carry out smoothing filter processing on the three-dimensional coordinates of the skeleton points and historical three-dimensional coordinates of a same hand location of the last frame image, to acquire stable skeleton points of a processed hand location; and
- fuse, render and display the stable skeleton points and the tracking data of the head location successively, to complete tracking and display of the hand location.

* * * * *